United States Patent
Schwanekamp et al.

(10) Patent No.: US 11,933,657 B2
(45) Date of Patent: Mar. 19, 2024

(54) METHOD FOR PUTTING INTO OPERATION AND/OR CHECKING AN ULTRASOUND THROUGHFLOW MEASURING POINT

(71) Applicant: Endress+Hauser Flowtec AG, Reinach (CH)

(72) Inventors: Guido Schwanekamp, Parede (PT); Michal Bezdek, Aesch (CH); Achim Wiest, Weil am Rhein (DE); Beat Kissling, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 366 days.

(21) Appl. No.: 17/416,168

(22) PCT Filed: Nov. 21, 2019

(86) PCT No.: PCT/EP2019/082036
§ 371 (c)(1),
(2) Date: Jun. 18, 2021

(87) PCT Pub. No.: WO2020/126281
PCT Pub. Date: Jun. 25, 2020

(65) Prior Publication Data
US 2022/0074784 A1    Mar. 10, 2022

(30) Foreign Application Priority Data

Dec. 21, 2018 (DE) .................. 10 2018 133 476.1

(51) Int. Cl.
*G01F 25/10* (2022.01)
*G01B 11/24* (2006.01)
(Continued)

(52) U.S. Cl.
CPC .............. *G01F 25/10* (2022.01); *G01B 11/24* (2013.01); *G01F 1/66* (2013.01); *G01F 1/662* (2013.01); *G01F 1/667* (2013.01); *G01F 25/00* (2013.01)

(58) Field of Classification Search
CPC . G01F 1/66; G01F 1/667; G01F 1/662; G01F 25/10; G01F 25/00; G01B 11/24
See application file for complete search history.

(56) References Cited

U.S. PATENT DOCUMENTS 9,557,200 B2    1/2017  Forster
2004/0173029 A1* 9/2004  Osone .................... G01F 1/667
                                                73/861.25
(Continued)

FOREIGN PATENT DOCUMENTS

CN    1711461 A    12/2005
CN    1726382 A    1/2006
(Continued)

OTHER PUBLICATIONS

English Translation of CN203224283.*

*Primary Examiner* — Helen C Kwok
(74) *Attorney, Agent, or Firm* — Mark A. Logan; Endress+Hauser (USA) Holding, Inc.

(57) ABSTRACT

A method for putting into operation and/or checking an ultrasonic, flow measuring point using a service unit, wherein the service unit has a display unit and a camera, wherein the measuring point includes a pipeline for conveying a medium and at least one ultrasonic transducer, includes identifying the measuring point vis a vis the service unit; ascertaining settable parameters based on the identity of the measuring point; registering geometric data of at least one part of the measuring point by means of the camera; analyzing registered geometric data and deriving at least one parameter value for at least one of the parameters to be set (Continued)

based on the analytical result and the identity; ascertaining at least one optimum mounting position based at least on the derived parameter value; and mounting an ultrasonic transducer at one of the ascertained optimum mounting positions.

10 Claims, 4 Drawing Sheets

(51) Int. Cl.
*G01F 1/66* (2022.01)
*G01F 1/667* (2022.01)
*G01F 25/00* (2022.01)

(56) References Cited

U.S. PATENT DOCUMENTS

| | | | | |
|---|---|---|---|---|
| 2006/0117867 A1* | 6/2006 | Froehlich | ............ | G01F 1/66 |
| | | | | 73/861.28 |
| 2006/0123922 A1* | 6/2006 | Froehlich | ............ | G01F 1/66 |
| | | | | 73/861.29 |
| 2006/0278015 A1* | 12/2006 | Wiest | ............ | G01F 15/02 |
| | | | | 73/861.18 |
| 2007/0151364 A1* | 7/2007 | Wiest | ............ | G01F 1/663 |
| | | | | 73/861.27 |
| 2007/0234791 A1* | 10/2007 | Wiest | ............ | G01F 15/00 |
| | | | | 73/170.13 |
| 2008/0022776 A1 | 1/2008 | Buchanan | | |
| 2011/0120231 A1 | 5/2011 | Berger et al. | | |
| 2011/0271769 A1 | 11/2011 | Kippersund et al. | | |
| 2016/0011026 A1 | 1/2016 | Scharnitzky | | |
| 2016/0131516 A1* | 5/2016 | Frohlich | ............ | G01F 25/10 |
| | | | | 73/1.16 |
| 2016/0323149 A1* | 11/2016 | Hu | ............ | G01F 1/00 |
| 2017/0223342 A1* | 8/2017 | Tan | ............ | H04N 13/254 |
| 2019/0154480 A1* | 5/2019 | Schöb | ............ | G01F 15/02 |
| 2021/0080303 A1* | 3/2021 | Wiest | ............ | G01F 25/10 |
| 2022/0049983 A1* | 2/2022 | Grunwald | ............ | G01F 1/667 |

FOREIGN PATENT DOCUMENTS

| | | |
|---|---|---|
| CN | 1867814 A | 11/2006 |
| CN | 203224283 U | 10/2013 |
| CN | 107636424 A | 1/2018 |
| CN | 207066375 U | 3/2018 |
| DE | 10147175 A1 | 4/2003 |
| DE | 102007023802 A1 | 11/2008 |
| DE | 102017130138 A1 | 6/2019 |
| EP | 1573276 B1 | 6/2009 |
| EP | 3413019 A2 | 12/2018 |
| JP | 2016217735 A | 12/2016 |
| JP | 2018119879 A | 8/2018 |

\* cited by examiner

METHOD FOR PUTTING INTO OPERATION AND/OR CHECKING AN ULTRASOUND THROUGHFLOW MEASURING POINT

CROSS-REFERENCE TO RELATED APPLICATIONS

The present application is related to and claims the priority benefit of German Patent Application No. 10 2018 133 476.1, filed on Dec. 21, 2018 and International Patent Application No. PCT/EP2019/082036, filed on Nov. 21, 2019, the entire contents of which are incorporated herein by reference.

TECHNICAL FIELD

Ultrasonic, flow measuring devices are often applied in process and automation technology. They permit in simple manner determination of volume flow rate and/or mass flow rate in a pipeline.

Known ultrasonic, flow measuring devices work frequently according to the travel time difference principle. In such case, the different travel times of ultrasonic waves, especially ultrasonic pulses, so-called bursts, are evaluated relative to the flow direction of the liquid. For this, ultrasonic pulses are sent at a certain angle to the pipe axis both with as well as also counter to the flow direction. From the travel time difference, flow velocity and therewith in the case of known diameter of the pipeline section volume flow rate can be determined.

BACKGROUND

The ultrasonic waves are produced and received with ultrasonic transducers. For this, the ultrasonic transducers are placed tightly against the tube wall of a pipeline section of interest. Clamp-on ultrasonic, flow measurement systems can be used. With these, the ultrasonic transducers are pressed externally of the tube on its tube wall. A significant advantage of clamp-on ultrasonic, flow measurement systems is that they do not contact the measured medium and can be placed on an already existing pipeline.

The ultrasonic transducers are normally composed of an electromechanical transducer element, e.g. a piezoelectric element, and a coupling layer. In the case of clamp-on systems, the ultrasonic waves are produced as acoustic signals in the electromechanical transducer element and propagate via the coupling layer to the tube wall and from there into the liquid.

Between the piezoelectric element and the coupling layer, another coupling layer can be arranged, a so-called matching layer. The matching layer, in such case, serves the function of transmitting the ultrasonic signal and simultaneously reducing a reflection at the boundary between two materials caused by different acoustic impedances.

Both in the case of clamp-on systems, as well as also in the case of inline systems, the ultrasonic transducer pairs are arranged in a shared plane on the tube, either on opposite sides of the tube, such that the acoustic signal propagates, projected on a tube cross section, at least once, or (N+1) times, along a secant through the tube, or on the same side of the tube, in which case the acoustic signal is reflected on the opposite side of the tube, whereby the acoustic signal traverses the tube at least two times, or N times, along secants projected on the cross section through the tube, wherein N is an even numbered, natural number. There are also clamp-on flow measuring points known, which have more than two ultrasonic transducers, which are arranged externally along the tube axis on one side or on opposite sides of the tube.

Clamp-on flow measuring devices are characterized by features including that they can be installed on an existing pipeline without process interruption. In order to be able to put a clamp-on device successfully into operation, some prerequisites must be fulfilled:

The sensor type must be correctly selected and installed in the electronics as a function of the application parameters. The sensor-specific parameters, in case available, must likewise be correctly transferred.

The separation of two ultrasonic transducers forming a sensor pair must be correctly calculated and set as a function of the application parameters.

The ultrasonic transducers must be oriented correctly relative to one another and relative to the tube axis.

The non-fulfillment of these prerequisites leads to an increased measurement uncertainty and in the extreme case to failure of the measuring.

Existing clamp-on systems offer only little support in the execution of the individual mounting steps. As a result, incorrect installations insufficiently fulfilling the above prerequisites repeatedly occur. Non-fulfillment of the prerequisites is, as a rule, not automatically detected and displayed.

Known from EP1573276B1 is an apparatus for positioning a clamp-on flow measuring device on a container with the help of a positioning unit provided with a display.

SUMMARY

An object of the invention is to provide a method, which simplifies the mounting of ultrasonic transducers on a pipeline.

The object is achieved by the method as defined in claim 1.

The method of the invention for putting into operation and/or checking an ultrasonic, flow measuring point using a service unit, wherein the service unit has at least one display unit and a camera, wherein the ultrasonic, flow measuring point includes a pipeline for conveying a medium and at least one ultrasonic transducer, comprises:

identifying the ultrasonic, flow measuring point vis a vis the service unit;

ascertaining settable parameters based on the identity of the ultrasonic, flow measuring point;

registering geometric data of at least one part of the ultrasonic, flow measuring point by means of the camera;

analyzing registered geometric data and deriving at least one parameter value for at least one of the parameters to be set based on the analytical result and the identity;

ascertaining at least one optimum mounting position based at least on the derived parameter value;

displaying by means of the display unit at least one optimum mounting position and/or at least the parameter value for at least one parameter to be set; and checking the mounting position of an ultrasonic transducer with one of the optimum mounting positions and/or positioning an ultrasonic transducer at one of the ascertained optimum mounting positions.

Advantageously, the geometric data of the ultrasonic, flow measuring point are registered by means of the camera and made available to the operator for putting the measuring point into operation. Especially advantageous is when the operator merely needs to record the ultrasonic, flow measuring point with the camera and receives the optimum mounting position directly displayed. The optimum mounting position includes also an optimum region, in which the ultrasonic transducer should preferably be positioned.

The display unit of the service unit shows the current field of view of the operator or the camera. The camera of the service unit registers simultaneously the setting and "sees" the same field of view as the operator. In the simplest case, the display unit is a combined transparent glass with a projector. The operator views through the glass. The setting considered through the glass is referred to as the field of view. The projector is embodied to cast a projection on the glass, which the operator perceives. Via the current field of view of the operator, then the optimum mounting position is displayed. It is provided that a symbol of the ultrasonic, flow measuring point is superimposed on the position corresponding to the optimum mounting position.

Various service units can be used for the putting into operation. In the simplest case, the service unit is part of the control/evaluation unit and connected with the ultrasonic transducers, thus with the ultrasonic, flow measuring point. Another opportunity is to use mobile end devices, such as smartphones, tablets or smart watches.

The display unit comprises in the simplest case a display mounted at the ultrasonic, flow measuring point, especially on the control/evaluation unit. Alternatively, the display unit is the display of a mobile end device or the screen of a smart glasses. Alternatively, the display unit is a projector, which projects the parameter to be set or the optimum mounting position onto the ultrasonic, flow measuring point, especially onto the pipeline.

The identification of the ultrasonic, flow measuring point can occur in different ways. In the simplest case, the operator selects the ultrasonic, flow measuring point from a list, which is displayed on the display unit of the service unit. Then, the process- and/or system variables and parameters to be set are retrieved from an internal database. Alternatively, identification data are read-out from the ultrasonic, flow measuring point, especially by means of a radio connection, especially Bluetooth or Wi-Fi, between ultrasonic, flow measuring point and service unit. Another option is optically identifying the field device. For this, the ultrasonic, flow measuring point is registered by means of the camera and examined for defined geometries, which are reconciled with a database. An optical identification of the field device includes also the read-out of an optical code, for example, a two-dimensional code, especially a barcode, a QR-code or a data matrix, which is placed on the ultrasonic, flow measuring point. With the identification of the measuring point, also an updating of the status, such as e.g. a changed signal strength, travel time, etc. can occur. Such is especially advantageous in the case of battery operated measuring points, since in the case of these, for energy reasons, a continuous communication of the unchanged state is not desired.

If process- and/or system variables are not available, there occurs after the identification an additional method step, in which the process- and/or system variables for ascertaining the flow are recorded by the operator. The process- and/or system variables include a tube diameter, a tube thickness, a tube material for determining the velocity of sound in the tube, a medium for determining the velocity of sound in the medium, and possibly also number of traverses. A recommended number of traverses can, however, also be ascertained and output by the device based on the above process parameter. Furthermore, the process- and/or system variables also comprise sensor dependent parameters, such as, for example, a sensor type, at least one sensor frequency, a center frequency and/or a frequency range, an angle in the ultrasonic transducer and/or a velocity of sound in the ultrasonic transducer.

Parameters can be set based on identity of the ultrasonic, flow measuring point. Settable parameters are the separation of the ultrasonic transducer from an inlet- or outlet-side disturbance, especially a valve, an elbow or a diaphragm, the angle between the longitudinal axis of an ultrasonic transducer and the tube axis, the angle between two ultrasonic transducer longitudinal axes, the separation between ultrasonic transducers, the orientation of an ultrasonic transducer and the central angle formed by a line intersecting the ultrasonic transducer and the vertical longitudinal plane of the tube. A further settable parameter can also be the number of traverses.

From the recorded geometric data, for example, the outer diameter of the measuring tube can be ascertained.

In the simplest case, the settable parameter consists exclusively of the separation to be set between two ultrasonic transducers or between a current and the optimum mounting position.

Known are ultrasonic, flow measuring points, in the case of which the ultrasonic transducers are mounted on the pipeline by means of an installation apparatus. Such is taken into consideration for ascertaining the optimum mounting position. Displayed then exclusively or supplementally is the optimum mounting position of the installation apparatus on the pipeline.

If it turns out after checking the mounting position that the ultrasonic transducer is located at one of the optimum mounting positions, the operator is informed of this optically on the display unit or by means of an acoustic signal.

In an embodiment, a reference geometry of the ultrasonic, flow measuring point is registered by means of the camera, wherein the reference geometry has in at least one dimension a defined length or a defined angle, wherein based on the reference geometry a three-dimensional topology model of the ultrasonic, flow measuring point is created, especially a model in the form of a three-dimensional, polygonal network.

Known from the literature is the SLAM-problem ("Simultaneous Localization and Mapping"). Its a problem of robotics, in the case of which a mobile robot must simultaneously create a map of its surroundings and estimate its position within such map. A solution for this problem is the calculating of a three dimensional topology model, especially a polygonal network, with the help of a reference geometry. The camera is either moved for this around the reference geometry or the angle of sight by the camera toward the reference geometry is slightly varied by means of small movements. By means of a stereo camera, this first step can be omitted. Alternatively, a depth camera can be used, which automatically performs this step. Then, a three-dimensional image of the measuring point is created in the form of a topology model. The defined length of at least one of the dimensions of the reference geometry is told to the service unit, whereby the service unit calculates a defined separation between characteristic features of the three dimensional topology model. By expanding, or spanning, for example, a polygonal network, the spatial size and the position of the service unit in the three dimensional space can be determined.

In the simplest case, there are placed on the ultrasonic, flow measuring point, thus, on the ultrasonic transducers, markings, which are the reference geometry. These can have a fixed length, or a fixed angle, according to which the service unit is guided for ascertaining the geometric data.

It is especially advantageous when the created topology model can be displayed and subsequently edited, or fitted by the operator by means of the service unit.

In an embodiment, the three-dimensional topology model is used, in order to ascertain the geometric data registered by the camera.

In a preferred additional development of the method of the invention, it is provided that the three-dimensional topology model is used, in order to measure objects registered by the camera and to define a ruler for the objects registered by the camera displayed in the field of view. Since the service unit knows the measures of the three dimensional topology model, any geometries, or geometric data, of the measuring point can be registered and measured. This method has a very high accuracy. In connection with the method of the invention, especially, the dimensions of the ultrasonic, flow measuring point and/or parts of the ultrasonic, flow measuring point, such as the pipeline or the ultrasonic transducers, are measured.

Displayed permanently on the display unit can be, for example, the dimensions of the parts and/or a ruler length, which dynamically changes, when the operator moves the camera toward or away from the parts of the ultrasonic, flow measuring point, or uses the zoom function of the camera.

Furthermore, the displayed dimensions adjust, when changes are made, such as shifting of the ultrasonic transducer at the measuring point.

The registering of the geometric data includes firstly detecting the measuring point by means of an image recognition algorithm, especially the individual components of the measuring point, from the recorded images, or from the topology model. If the individual components are unequivocally identified, then the geometric data can be derived.

In an embodiment, in the context of analyzing the registered geometric data, at least one three-dimensional visualization model of at least one part of the ultrasonic, flow measuring point is created.

The three-dimensional visualization model can be differently embodied. In the simplest case, it is a marking in the form, for example, of an arrow, which indicates the optimum mounting position or an optimum orientation. In an additional development, the three-dimensional visualization model represents a region, in which the ultrasonic transducer should be mounted. Ideally, the three-dimensional visualization model represents an ultrasonic transducer in the form of the ultrasonic transducer to be used, so that the operator must merely assure that the contour of the ultrasonic transducer to be used agrees with the three dimensional visualization model.

In an embodiment, the method further includes the method steps:

displaying the three dimensional visualization model at the optimum mounting position on the pipeline, registering geometric- and positional data of at least the mounted flow transducer by means of the camera;

checking agreement between the geometric- and positional data of the three dimensional visualization model and the geometric- and positional data of the mounted ultrasonic transducer by means of the service unit, wherein the three-dimensional topology model is used, in order to ascertain the positional data registered by the camera.

The service unit is advantageous adapted by means of the geometric data of the ultrasonic, flow measuring point to determine the geometric- and positional data of the ultrasonic transducer.

If these agree with the geometric- and positional data of the three dimensional visualization model produced based on the optimum mounting position and the identity of the ultrasonic, flow measuring point, then the putting into operation is completed.

In an embodiment, the field of view of the operator is represented on the display unit, and wherein the visualization model superimposes, at least partially, on the part of the ultrasonic, flow measuring point in the field of view represented by the display unit.

It is especially advantageous when the visualization model is represented directly on the field of view represented by means of the display unit, or is represented with the ultrasonic, flow measuring point superimposed. Thus, the operator will be directly shown at the affected point, how further to proceed to install the ultrasonic, flow measuring point in optimum manner. This method is suited for service units, which have a transparent glass.

In an embodiment, the display unit shows as field of view of the operator a continually updated image registered by the camera, wherein the visualization model is, at least partially, superimposed on the parts of the ultrasonic, flow measuring point in the image shown on the display unit.

The display unit of the service unit shows the live image, as recorded by the camera. The operator should direct the service unit at the ultrasonic, flow measuring point in such a manner that the separate parts of the ultrasonic, flow measuring point are registered by the camera. The visualization model is laid over the current live image of the camera. This method is suited for service units, which do not have a transparent glass, but, instead, a conventional display as display unit.

In an embodiment, the method further includes the method step:

analyzing registered positional data and deriving at least one parameter value for at least one of the parameters to be set based on the analytical result and the identity.

It is especially advantageous that the mounting or positioning of the ultrasonic transducers is monitored with the camera and the service unit. If the ultrasonic transducers are properly mounted, this can be signaled to the operator, for example, with the service unit or displayed on the display unit.

In an embodiment, the service unit is a smart glasses.

It is especially advantageous that the service unit be a smart glasses. In this way, the operator does not besides performing the setup and placement of the ultrasonic transducer and reconciliation thereof with the displayed optimum mounting position still supplementally have to hold the service unit.

Smart glasses have a screen, which displays the field of view recorded by the camera. To the operator, it appears as if the field of view registered by the camera is registered by the operators own eyes. Alternatively, a smart glasses includes a projector, which projects an image on a screen, or a glass of the eyeglasses. The operator sees the setting through the screen of the eyeglasses. At the same time, a camera of the eyeglasses registers the setting to the degree that the eyes of the operator register the setting. Instead of projecting the entire field of view of the setting recorded by the camera onto the screen, only the visualization model is projected onto the screen. An example of such a smart glasses of the latter type suitable for the method of the invention is the "HoloLens" of Microsoft.

In an embodiment, the service unit is a mobile end device.

Suited for this is, for example, a smart phone or a tablet, however, also a laptop, which has a webcam, which enables registering the setting in the opposite direction from the operator. The selection of a symbol, the increasing/lessening of a parameter value, the confirming of a parameter value and/or the shifting of a symbol occurs by means of the input means of the mobile end device, for example, by means of the touchscreen, by means of keyboard input and/or by means of input via mouse.

In an embodiment, the display unit is a projector, preferably a portable, autarkic projector, which projects the visualization model onto the pipeline.

In an embodiment, the camera and the display unit are mounted on at least one tripod and arranged at a defined separation from the pipeline.

In an embodiment, the display unit is a projector, preferably a portable, autarkic projector, which projects a dynamic light-pattern on the pipeline and so obtains the geometric data. Dynamic means, in this case, that, for example, a grid is projected on the scene and the grid is changed in position as a function of time. The geometric data are ascertained by means of electro-optical separation measurement and preferably by means of optical triangulation.

In an embodiment, the method further includes method steps:
transferring measured values ascertained by means of the ultrasonic, flow measuring point to the service unit;
ascertaining the optimum mounting position taking into consideration the measured values; and
updating the optimum mounting position as a function of the measured values.

In an advantageous embodiment of the method of the invention, it is provided that the measured values and/or the identity of the flow measuring point are transmitted to the service unit by means of a radio connection, especially Bluetooth. Alternatively to Bluetooth, any radio connection can be used, for example, Wi-Fi or ZigBee. Alternatively, the measured values can be transmitted indirectly to the service unit. For this, the measured values are sent to the service unit not on direct paths, but, instead, from the ultrasonic, flow measuring device to an intermediate location, for example, to the control station of the plant, to another ultrasonic, flow measuring device, to another service unit, to a cloud-based database, etc., from where the measured values are then transmitted to the service unit.

In an embodiment, the camera is not placed at the service unit, but, instead, can only exchange data with the service unit. In such case, the camera can be used exclusively for recording images, which are then transmitted to the service unit and evaluated there. Alternatively, the camera is adapted to ascertain the geometric data based on the images and to forward the geometric data to the service unit.

In an embodiment, the service unit takes into consideration measured values ascertained by means of the ultrasonic, flow measuring point for determining the optimum mounting position. Measured values comprise a signal intensity and/or a signal-to-noise ratio. In the case of the mounting of the ultrasonic transducer, it can happen that, in spite of using the optimum mounting position, no sufficiently high signal intensity is detected. This occurs, for example, when air is located in the signal path, corroded tube surfaces are present or accretion has formed in the inside of the tube. If the signal intensity is not as high as expected, a new optimum mounting position is ascertained by the service unit and output to the display unit.

The invention will now be explained in greater detail based on the appended drawing, the figures of which show as follows:

DETAILED DESCRIPTION

Figure 1:
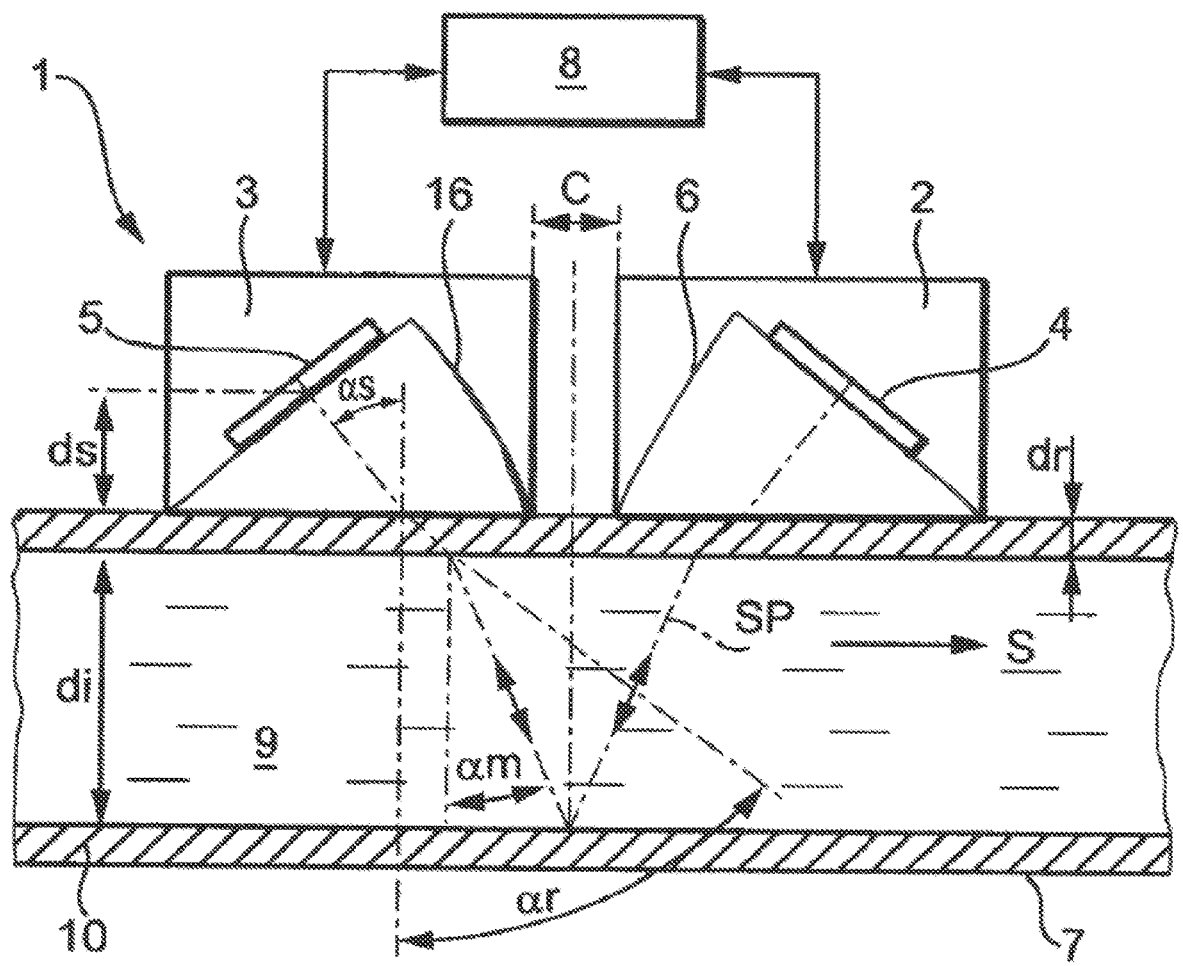
FIG. 1 shows an ultrasonic, flow measuring point according to the state of the art.

FIG. 1 shows a schematic view of the sound path SP of an ultrasonic, measuring signal in a pipeline, or tube 7. The clamp-on flow measuring device 1 ascertains volume flow rate, or mass flow rate, of the medium 9 in the tube 7 according to the known travel time difference method.

Essential parts of the clamp-on, ultrasonic, flow measuring device 1 are the two ultrasonic transducers, ultrasonic sensors, 2; 3, and the control/evaluation unit 8. The two ultrasonic transducers 2; 3 are mounted on the tube 7 by means of a securement apparatus (not shown). Appropriate securement apparatuses are sufficiently known in the state of the art and are also produced and sold by the applicant. The tube 7 of inner diameter di is flowed through by the medium 9 in the stream direction S.

An ultrasonic transducer 2; 3 includes as essential components at least one piezoelectric element 4; 5, which produces and/or receives the ultrasonic, measuring signals, and a coupling wedge 6; 16.

The ultrasonic, measuring signals are in-coupled into the tube 7 flowed through by the medium 9, and out-coupled from the tube 7, via the coupling wedge 6; 16 and via the tube wall 10. The two ultrasonic transducers 2; 3 are embodied in such a manner that they transmit and receive ultrasonic, measuring signals. The optimum separation c of the two ultrasonic transducers 2; 3 is—such as already described above—dependent on various system- and/or process variables. In order to assure that the maximum energy, which is transmitted from an ultrasonic transducer 2; 3, is also received in the other ultrasonic transducer 3; 2, a positioning of an ultrasonic transducer 2; 3 adapted to the particular case of application is required. These system- and process variables include, for example, the inner diameter di of the tube 7, the thickness dt of the tube 7, the velocity of sound cr in the tube material, and the velocity of sound cm in the medium 9. In principle, an adjustment of the ultrasonic transducers 2; 3 is required both in the case of the first mounting as well as also always when there is a significant change of at least one process- and/or system variable.

In the illustrated example of an embodiment, the separation c between the two ultrasonic transducers 2; 3 is so dimensioned that the ultrasonic, measuring signals, which corresponding to the travel time difference method are alternately transmitted and received from and by the two ultrasonic transducers 2; 3, propagate only via a sound path SP in the container 7 flowed through by the medium 9. The sound path SP has two traverses. One traverse designates the part of the sound path SP, in which an ultrasonic, measuring signal crosses the container 7 once. The crossing can be diametral or on a chord.

If the following variables are at least approximately known, then the optimum mounting position for the ultrasonic transducer can be calculated. The variables are:
the separation ds of an ultrasonic transducer 2; 3 from the tube wall 10;

the thickness dr of the tube wall 10;
the inner diameter di of the tube 7;
the velocity of sound cs in the lead-in element 6; 16;
the velocity of sound Cr in the tube 7;
the velocity of sound Cm in the medium 9;
the angle as in the ultrasonic transducer 2; 3;
the angle ar in the tube 7;
the angle am in the medium;
the number N of traverses. In the illustrated case, N=2.

The angle of incidence ar in the tube 7 can be represented with the aid of Snell's' law by the following formula:

$$ar = a\sin\left(\frac{cr}{cs} \cdot \sin(as)\right)$$

The angle of incidence in the medium 9 can be described by the following formula:

$$am = a\sin\left(\frac{cm}{cs} \cdot \sin(as)\right)$$

The travel time T desired of the ultrasonic, measuring signals on the sound path SP can then be calculated based on the following formula:

$$Tdesired = \frac{2 \cdot ds}{\cos(as) \cdot cs} + \frac{2 \cdot dr}{\cos(ar) \cdot cr} + \frac{n \cdot di}{\cos(am) \cdot cm}$$

If all parameters are known, then the travel time T desired of the ultrasonic, measuring signal is calculated according to above formula. In such case, moreover, the assumption was made that the flow in the pipeline 7 is zero. In a large number of cases, at least the velocity of sound cm in the medium 9 is not known. It depends on the temperature, the pressure and the composition of the medium. As a result, the measured travel time Tactual does not agree with the calculated travel time T desired, since in many cases for the purpose of simplification an estimated value is used for the velocity of sound cm in the medium 9. A better result can be achieved, when the velocity of sound cm in the medium 9 is measured in a separate procedure.

Then, the actual travel time Tactual of the ultrasonic, measuring signal is measured and compared with the calculated travel time T desired. If it results based on the comparison that the measured travel time Tactual is greater than the predetermined travel time T desired, then the two ultrasonic transducers 2; 3 must be moved closer together, the separation c between the two ultrasonic transducers 2; 3 is, thus, decreased. If, in contrast, the measured travel time Tactual is less than the predetermined travel time T desired, then the two ultrasonic transducers 2; 3 must be moved apart, i.e. the separation c is enlarged. According to the invention, the operator is now shown on the display unit, in which direction and, in given cases, by how much, the relative movement of the ultrasonic transducers 2; 3 has to occur or at which position on the pipeline the ultrasonic transducer 2; 3 is to be mounted.

Figure 2:
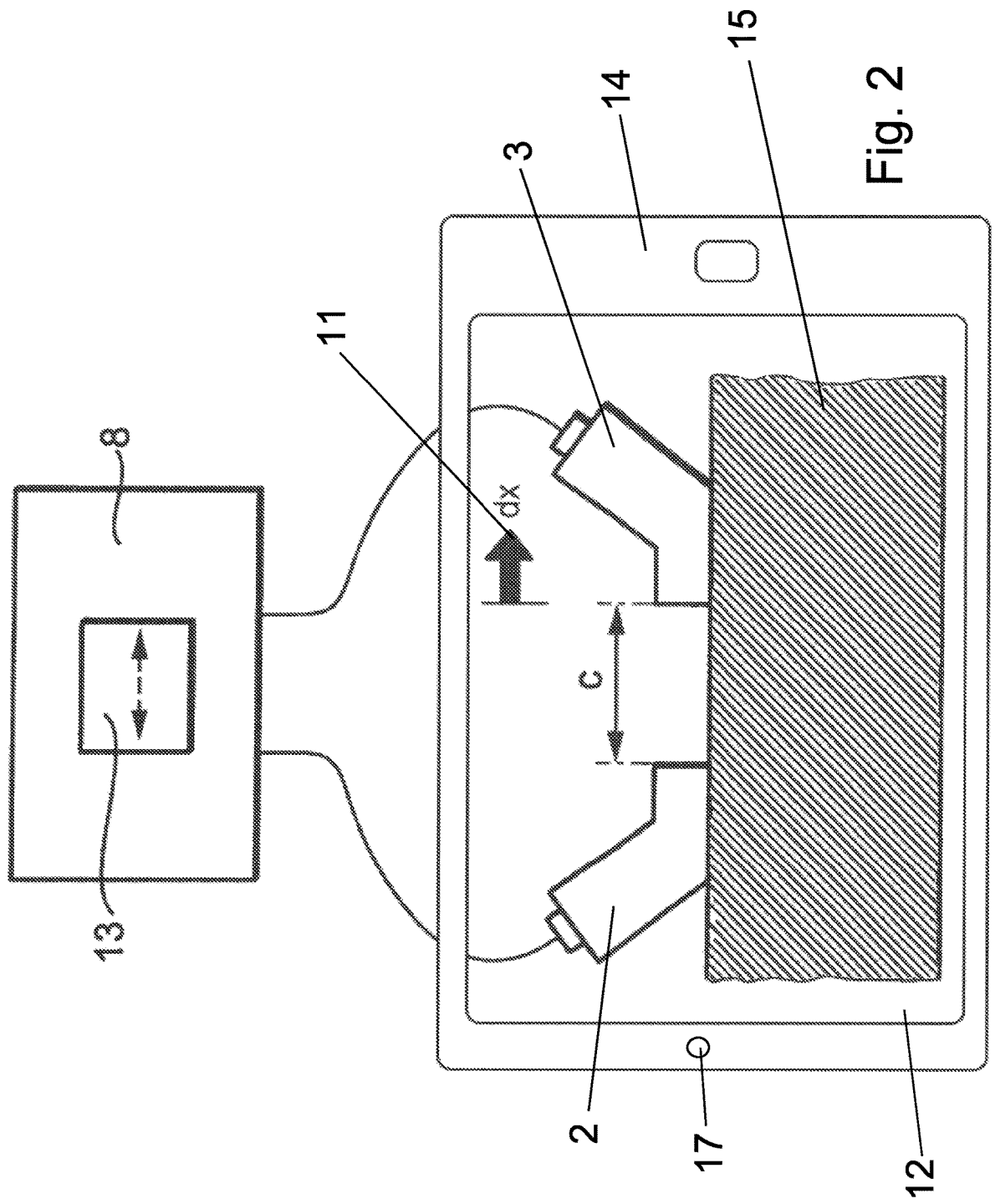
FIG. 2 shows a schematic view of putting an ultrasonic, flow measuring point into operation.

FIG. 2 shows a first embodiment of the method of the invention. By means of the service unit 14, in this case, a smart phone or a tablet, especially by means of the camera 17 on the service unit 14, the set separation between the two ultrasonic transducers 2; 3 is ascertained and a separation dx to be set required for reaching the optimum mounting position is calculated and displayed by means of the display unit 12. The visualization model 11 is an arrow, which gives the direction, in which the second ultrasonic transducer 3 must be shifted. Additionally, also the distance dx is displayed, by which the second ultrasonic transducer 3 must be shifted.

Figure 3:
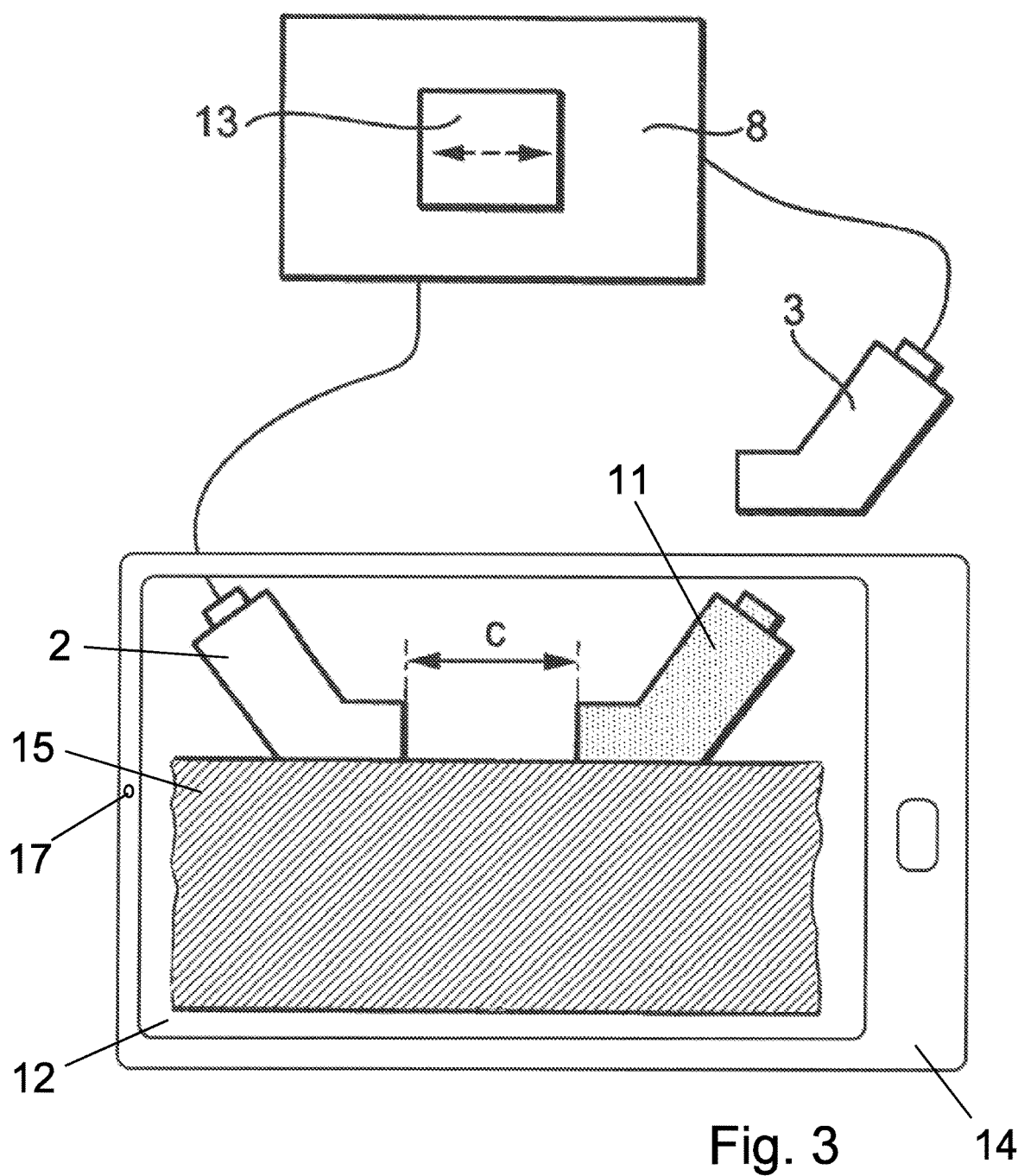
FIG. 3 shows another schematic view of putting an ultrasonic, flow measuring point into operation.

FIG. 3 shows a second embodiment of the method of the invention. By means of the service unit 14, there is placed, or projected, on the display unit 12 supplementally to the image recorded with the camera 17 a three-dimensional visualization model 11 on the pipeline 15. The visualization model 11 is created based on the registered geometric- and positional data. The operator need now only so mount the second ultrasonic transducer 3 on the pipeline 15 that the geometric- and positional data of the second ultrasonic transducer 3 recorded by means of the camera 17 and service unit 14 mounted on the side far from the display agree with the geometric- and positional data of the visualization model 11. If this occurs, then the ultrasonic, flow measuring point is put into operation.

Figure 4:
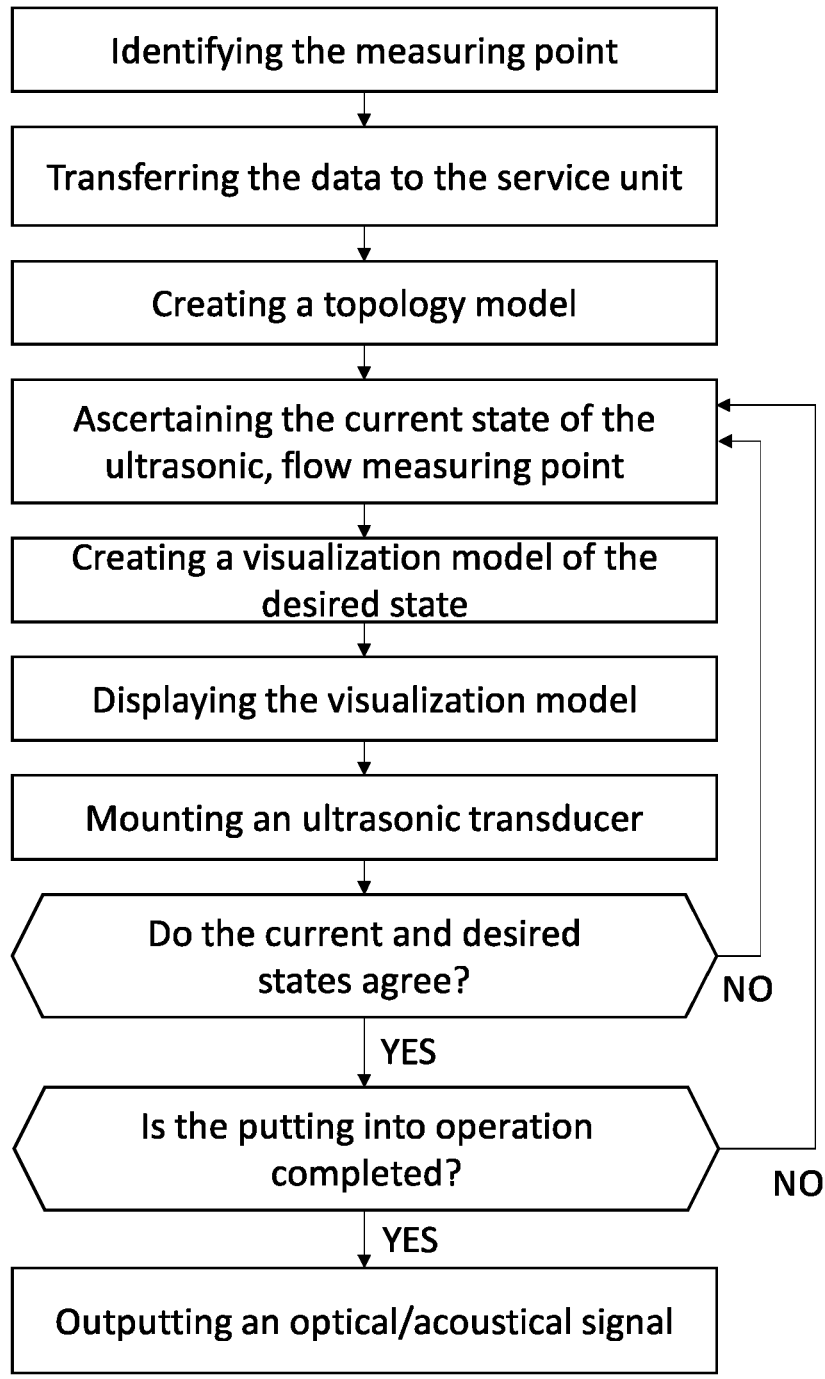
FIG. 4 shows a process flow chart for a first embodiment of the method of the present disclosure.

FIG. 4 shows, by way of example, a process flow chart for putting a clamp-on ultrasonic, flow measurement system into operation. The method in the following is described for the case that a measuring point is put into operation for the first time. In a first step, the operator identifies the present measuring point with the camera of a service unit. In this embodiment, the service unit is a smart glasses. The smart glasses includes a screen, which functions as output unit, and on which is displayed by means of a projector the identity of the measuring point. The identity includes status information and the variables required for ascertaining the optimum mounting position. If the list of variables is incomplete, the operator is informed of such on the display, so that the operator can still register the missing variables. Furthermore, based on the registered identity, also a traverse arrangement can be provided and displayed on the display unit. After identification of the measuring point, a topology model of the measuring point is created based on the images registered with the camera. The images are analyzed with the help of an image recognition algorithm and individual components of the measuring point, such as tube, ultrasonic transducer or disturbance, are identified. Therefrom, the geometric data of the measuring point, or of the individual components, can be ascertained and a current state derived. In such case, the current state describes a pipeline without ultrasonic transducers, the selectable parameters have not yet been set. Based on the identity of the measuring point and the current state, a desired state is created. From the desired state, a visualization model is ascertained, which is displayed on the screen. In such case, there is displayed at the measuring point, especially on the outer region of the tube, a region, in which the first ultrasonic transducer should preferably be mounted. This region depends on the identity of the measuring point and possible disturbances at the entrance or exit. The visualization model is projected onto the screen for the operator. The measuring point registered in the field of view of the operator is, in such case, superimposed with the visualization model. The operator obtains, thus, information concerning where exactly the first ultrasonic transducer should be positioned and mounts it. After the mounting, the positional data of the mounted ultrasonic transducer are ascertained and compared with the previously ascertained, optimum mounting position. If these agree, it is checked whether the putting into operation is completed. The service unit detects on the images recorded and analyzed by means of the camera that only a single ultrasonic transducer has been mounted. The service unit ascertains from the positional data of the first ultrasonic transducer at least one optimum mounting position for the second ultrasonic transducer. The visualization model adjusts to this situation, so that the operator is displayed in the field of view the optimum mounting position, this time in the form of an ultrasonic transducer. The operator mounts the second ultrasonic transducer at the displayed position. Only when, for example, the contours of the mounted ultrasonic transducer agree with the contours of the visualization model and the selectable parameters, thus, assume the desired state, is the putting into operation completed. On the screen, then the operator is displayed in a last method step the information that a successful mounting of the ultrasonic transducer has occurred.

The invention claimed is:

1. A method for putting into operation and/or checking an ultrasonic, flow measuring point using a service unit, wherein the service unit has a display unit and a camera, wherein the ultrasonic, flow measuring point includes a pipeline for conveying a medium and further includes an ultrasonic transducer, the method comprising:
identifying the ultrasonic, flow measuring point vis-à-vis the service unit;
ascertaining settable parameters based on the identifying of the ultrasonic, flow measuring point;
registering geometric data of at least one part of the ultrasonic, flow measuring point by using the camera;
analyzing the registered geometric; data
deriving a parameter value for at least one of the settable parameters based on the analyzing of the registered geometric data and on the identity of the ultrasonic, flow measuring point;
ascertaining an optimum mounting position based on the derived parameter value;
displaying via the display unit the optimum mounting position and/or the parameter value for the at least one settable parameter; and
checking a mounting position of the ultrasonic transducer with the optimum mounting position and/or positioning the ultrasonic transducer at the ascertained optimum mounting position.

2. The method as claimed in claim 1, further comprising:
registering by means of the camera a reference geometry of the ultrasonic, flow measuring point, wherein the reference geometry has in at least one dimension a defined length or a defined angle; and
creating a three-dimensional topology model of the ultrasonic, flow measuring point based on the reference geometry.

3. The method as claimed in claim 2,
wherein the three-dimensional topology model is used to ascertain the geometric data registered by the camera.

4. The method as claimed in claim 3,
wherein the analyzing of the registered geometric data includes creating at least one visualization model, including a three-dimensional visualization model, of at least one part of the ultrasonic, flow measuring point.

5. The method as claimed in claim 4, further comprising:
displaying the visualization model at the optimum mounting position on the pipeline;
registering geometric- and positional data of the ultrasonic transducer using the camera; and
comparing geometric—and positional data of the three dimensional visualization model with the registered geometric- and positional data of the ultrasonic transducer using the service unit, wherein the three-dimensional topology model is used to ascertain the positional data registered by the camera.

6. The method as claimed in claim 5, further comprising:
representing on the display unit a field of view of an operator; and
superimposing the visualization model, at least partially, on a part of the ultrasonic, flow measuring point in the field of view represented by the display unit.

7. The method as claimed in claim 6,
wherein the display unit shows as the field of view of the operator, a continually updated image registered by the camera, and wherein the visualization model is, at least partially, superimposed on the ultrasonic, flow measuring point shown on the display unit.

8. The method as claimed in claim 5, further comprising:
analyzing registered positional data and deriving at least one parameter value for at least one of the parameters to be set based on the analyzing of the registered geometric data and on the identifying of the ultrasonic, flow measuring point.

9. The method as claimed in claim 8, wherein the service unit is a smart glasses.

10. The method as claimed in claim 8, wherein the service unit is a mobile end device.

* * * * *